(12) United States Patent
Ito et al.

(10) Patent No.: US 6,577,814 B1
(45) Date of Patent: Jun. 10, 2003

(54) VIDEO DATA RECORDING AND REPRODUCTION USING TIME SLOT ALLOCATION

(75) Inventors: Norikazu Ito, Kanagawa (JP); Hiroyuki Fujita, Kanagawa (JP); Satoshi Yoneya, Kanagawa (JP); Masakazu Yoshimoto, Kanagawa (JP); Satoshi Katsuo, Kanagawa (JP); Jun Yoshikawa, Kanagawa (JP); Satoshi Yutani, Kanagawa (JP); Koichi Sato, Tokyo (JP); Tomohisa Shiga, Kanagawa (JP); Masaki Hirose, Kanagawa (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 09/250,967

(22) Filed: Feb. 16, 1999

(30) Foreign Application Priority Data

Feb. 17, 1998 (JP) ............................................. 10-034861

(51) Int. Cl.[7] .............................. H04N 5/781; H04N 5/91
(52) U.S. Cl. ..................................................... 386/125
(58) Field of Search ............................. 386/46, 68, 69, 386/96, 106, 109, 125, 126

(56) References Cited

U.S. PATENT DOCUMENTS

| | | | | |
|---|---|---|---|---|
| 5,487,035 A | * | 1/1996 | Nishimura et al. | 365/189.02 |
| 5,612,790 A | * | 3/1997 | Sakamoto et al. | 368/69 |
| 5,719,985 A | * | 2/1998 | Ito et al. | 386/109 |
| 6,181,867 B1 | * | 1/2001 | Kenner et al. | 386/46 |
| 6,434,324 B1 | * | 8/2002 | Iwasaki et al. | 386/106 |

FOREIGN PATENT DOCUMENTS

| | | |
|---|---|---|
| EP | 0 646 874 | 4/1995 |
| EP | 0 655 865 | 5/1995 |
| EP | 0 737 929 | 10/1996 |
| EP | 0 817 421 | 1/1998 |

OTHER PUBLICATIONS

David A. Patterson et al: "A Case for Redundant Arrays of Inexpensive Disks (Raid)" ACM Proceedings of SIGMOD. International Conference on Management of Data, XX, XX, Jun. 1, 1988, pp. 109–116 XP000996447.

* cited by examiner

Primary Examiner—Huy Nguyen
(74) Attorney, Agent, or Firm—Frommer Lawrence & Haug LLP; William S. Frommer; Hans R. Mahr

(57) ABSTRACT

A data recording/reproducing apparatus comprises a data recording/reproducing component for recording data including audio and/or video data in and reproducing such data from a plurality of non-linearly accessible recording medium, a plurality of input/output processing sections for processing the input data and outputting them to the recording/reproducing component, while processing the data output from the recording/reproducing component and outputting them, a controller for controlling the input/output processing sections so as to make them carry out the processing operations in the allocated respective time slots and outputting time slot signals with a fixed cycle period to the respective input/output processing sections, the controller being so adapted that, when there is an idle input/output processing section out of the plurality of input/output processing sections, it outputs the time slot signals to be output to the idle input/output processing section to the remaining input/output processing section. With such an arrangement, more time slots are allocated to the busy input/output processing sections, which can therefore output an increased number of data sheets per unit time for a high speed data reproducing operation to improve the operability of the apparatus.

10 Claims, 7 Drawing Sheets

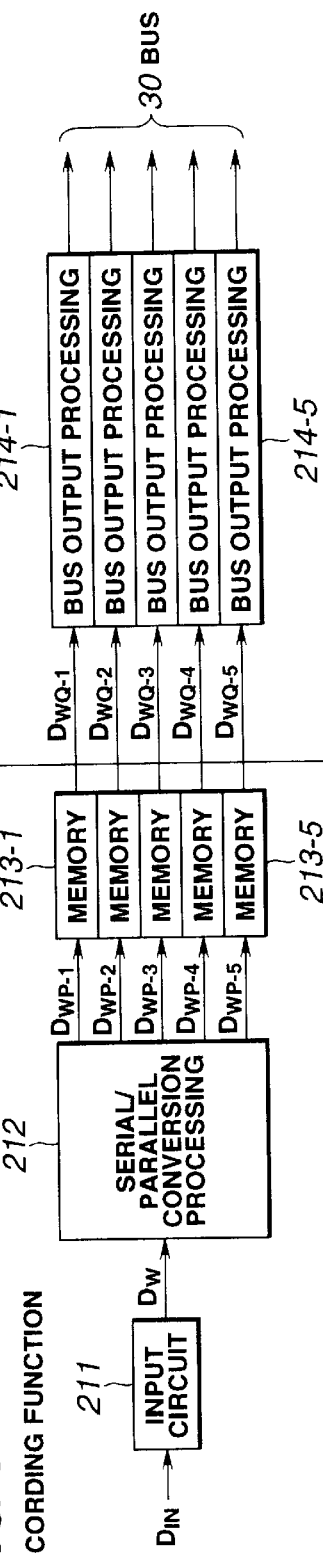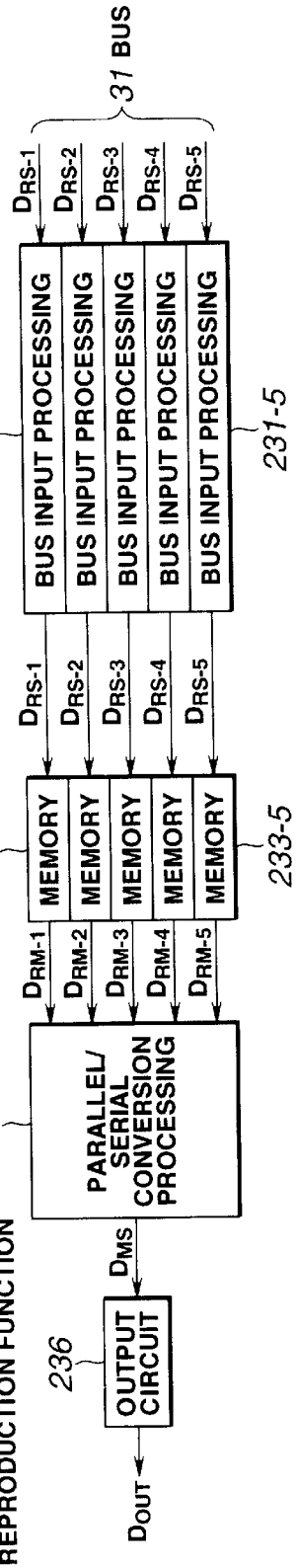
FIG.3A RECORDING FUNCTION
FIG.3B REPRODUCTION FUNCTION

VIDEO DATA RECORDING AND REPRODUCTION USING TIME SLOT ALLOCATION

BACKGROUND OF THE INVENTION

1. Field of the Invention

This invention relates to a data input/output apparatus and a data input/output method to be suitably used for an AV server system.

2. Description of the Prior Art

The increased number of channels that have become available for accessing to various types of information due to, if partly, the development of CATV (cable television) in recent years has by turn given rise to a strong demand for novel audio/video data recording/reproducing apparatus adapted to recording and reproducing different sets of audio/video data concurrently with a single apparatus. As a matter of fact, apparatus referred to as video servers (or AV (audio and/or video) servers) and adapted to concurrently recording different sets of audio/video data in and also reproducing such data from randomly accessible recording means such as hard disks have getting popularity to meet this demand.

Generally, a video server installed in a broadcasting station is required to show a high data transfer rate and have a huge recording capacity in order to meet various requirements including a high image and sound quality and a long recording time. Thus, attempts have been made to produce a high data transfer rate and a high recording capacity by introducing a data recording/reproducing apparatus capable of dealing with a plurality of hard disks (hereinafter referred to as HD) units concurrently and storing parity data in the apparatus in advance so that the overall reliability of the apparatus may be maintained if one or more than one of the HD units fail. With such an arrangement, it is possible to realize a multi-channel video server adapted to a variety of applications such as VOD (video on demand) and NVOD (near video on demand) systems, where same source data comprising a plurality of different sets of audio/video data are recorded in a distributed fashion and then reproduced simultaneously or with slight time differences before they are transmitted through a multiple of channels.

The data recording/reproducing apparatus used in such a video server is based on the RAID (redundant arrays of inexpensive disks) technology of utilizing a plurality of hard disk drives (hereinafter referred to as HDDs), each being adapted to drive a plurality of hard disks, as described in Patterson et al. ("EA Case for Redundant Arrays of Inexpensive Disks (RAID)", ACM SIGMOND Conference, Chicago, Ill., Jun. 1–3, 1998.)

According to the above paper, the RAID technology may be classified into five categories, RAID-1 through RAID-5. Category RAID-1 used to write same data in a pair of HDDs. With Category RAID-3, the input data are divided into groups of data having a predetermined length and recorded in a plurality of HDDs, while a parity data is generated as exclusive OR of the corresponding data blocks of each HDD and written in another HDD. With Category RAID-5, on the other hand, data are divided into large units (blocks) and the data of each unit are recorded in an HDD as data block, while the outcome of exclusive OR (a parity data) of the corresponding data blocks of each HDD is recorded in other HDDs as a parity block in a distributed fashion.

For the remaining aspects of RAID, reference should be made to the above identified paper.

An AV server system as described above comprises a data storage consisting of a plurality of hard disks for storing AV data, a plurality of AV data input/output interfaces (hereinafter referred to as ports) for inputting AV data into and outputting such data from the data storage and a system controller for controlling the operation of the entire system. Each port has a memory for regulating the timing of retrieving out AV data from and that of storing AV into the data storage. Then, an AV server system having the above described configuration performs processmg operations concurrently for a multiple of channels as the system controller controls the ports in such a way that they are used evenly and cyclically on a time division basis with a predetermined period. More specifically, each port processes AV data for a single channel on a time division basis so that, as a result, AV date are processed for all the channels simultaneously by the ports, the number of which is equal to that of the channels. Therefore, with such an AV server system, time slots are allocated to the ports of the multiple of channels periodically in a rigid fashion. Then, as a general practice, the length of each time slot is made as short as possible in order to minimize the queuing time of each port, provided that the time length required for each port to read and reproduce a given volume of data from the memory at an ordinary rate is secured.

Now, the operation of allocating time slots to an AV server having four ports, port 1 through port 4, will be described by referring to FIG. 1 of the accompanying drawings.

In the example of FIG. 1, the system controller evenly divides each cycle period into equal four time slots and allocates them sequentially to Port 1 through Port 4 so that the time allocation proceeds with a fixed period. In other words, every fourth time slot is allocated to each port and one fourth of each period is given to the port.

Assume now, in FIG. 1, that AV data are being read and reproduced from the data storage at high speed at Port 1 and AV data are being written onto a hard disk of the data storage at Port 3, whereas both Port 2 and Port 4 remain idle. Then, the number of data sheets that Port 1 can reproduce per unit time is equal to the number of data sheets that the memory of Port 1 can read in a time slot.

If the image being reproduced is reoriented and/or the rate or reproduction is modified in the time slot of Port 2, the corresponding image reproducing operation cannot take place until the next data reading operation at Port 1 is completed or after the end of the next 3 to 4 time slots.

Thus, known AV server systems having a configuration as described above are accompanied by the problems as identified below particularly when reproducing data at high speed because the length of the time slot is selected on the basis of ordinary AV data reproducing operations.

Firstly, with such known AV server systems, storage areas on the currently active hard disk have to be accessed discontinuously in a high speed AV data reproduction mode of operation so that a large portion of the time dedicated to the data reproducing operation is actually consumed for the accessing process at the cost of the time necessary for reading data. Therefore, the above described time slot allocation scheme is not very effective and the number of data sheets reproduced per unit time is reduced significantly particularly during high speed data reproducing operations so that images may be displayed like those of a slow-speed film and the operation of searching out any wanted image can become very cumbersome in the editing session. Thus, there is a demand for an AV server system that can output as many data sheets in a high speed reproduction mode as it can in an ordinary speed reproduction mode.

Secondly, such known AV server systems cannot respond to a command for an operation of reversing the reproducing direction or a similar operation issued by way of the control panel until the next time slot allocated to the related channel or port comes to make the system rather clumsy and inefficient.

SUMMARY OF THE INVENTION

In view of the above identified problems and other problems, it is therefore the object of the present invention to provide a data input/output apparatus and a data input/output method that can output an increased number of data sheets in a high speed reproduction mode and be operated comfortably and efficiently.

According to the invention, the above object is achieved by providing a data recording/reproducing apparatus comprising:

a data recording/reproducing means for recording data including audio and/or video data in and reproducing such data from a plurality of non-linearly accessible recording medium;

a plurality of input/output processing means for processing said input data and outputting them to said recording/reproducing means, while processing said data output from said recording/reproducing means and outputting them; and a control means for controlling said input/output processing means so as to make them carry out said processing operations in the allocated respective time slots and outputting time slot signals with a fixed cycle period to the respective input/output means;

said control means being so adapted that, when there is an idle input/output processing means out of said plurality of input/output processing means, it outputs the time slot signals to be output to said idle input/output processing means to the remaining input/output processing means.

According to another aspect of the invention, there is provided a data recording/reproducing method to be used for a data recording/reproducing apparatus comprising a plurality of input/output processing sections for processing and outputting input data including audio and/or video data and a plurality of non-linearly accessible recording medium in order to record said data output from said input/output processing sections in said recording medium and also to reproduce the data recorded in said recording medium and output them to said input/output processing sections; said method comprising:

a first step of allocating time slot signals with a fixed cycle period to said input/output processing sections respectively; and a second step of causing each of said input/output processing sections to carry out an operation of said data in the time slots allocated to it in said first step and output the processed data to said recording medium and also causing it to process the data output from the related recording medium and externally output the processed data; said method being so adapted that, when there is an idle input/output processing section out of said plurality of input/output processing sections, it causes the time slot signals scheduled to be output to said idle input/output processing means to be actually output to the remaining input/output processing means.

Thus, with a data input/output apparatus according to the invention and having a configuration as described above, the control means can allocate more than one time slots to a particular data input/output interface in a period for a data input/output operation under certain conditions to duplicate or triplicate the time that can be used for the data input/output interface so that the volume of outpput data per unit time can be remarkably increased particularly for high speed data reproducing operations to facilitate the operation of searching images and the queuing time of each data input/output interface waiting for the next time slot can be significantly reduced to improve the responsiveness and the operability of the apparatus.

With a data input/output method according to the invention, again, more than one time slots can be allocated to a particular data input/output interface in a period for a data input/output operation under certain conditions to duplicate or triplicate the time that can be used for the data input/output interface so that the volume of output data per unit time can be remarkably increased particularly for high speed data reproducing operations to facilitate the operation of searching images and the queuing time of each data input/output interface waiting for the next time slot can be significantly reduced to improve the responsiveness to the user's operation.

BRIEF DESCRIPTION OF THE DRAWINGS

FIG. 3A is a schematic block diagram of each of the input/output processing sections for the recording side of the function.

FIG. 3B is a schematic block diagram of each of the input/output processing sections for the reproduction side of the function.

DETAILED DESCRIPTION OF THE PREFERRED EMBODIMENTS

Figure 1:
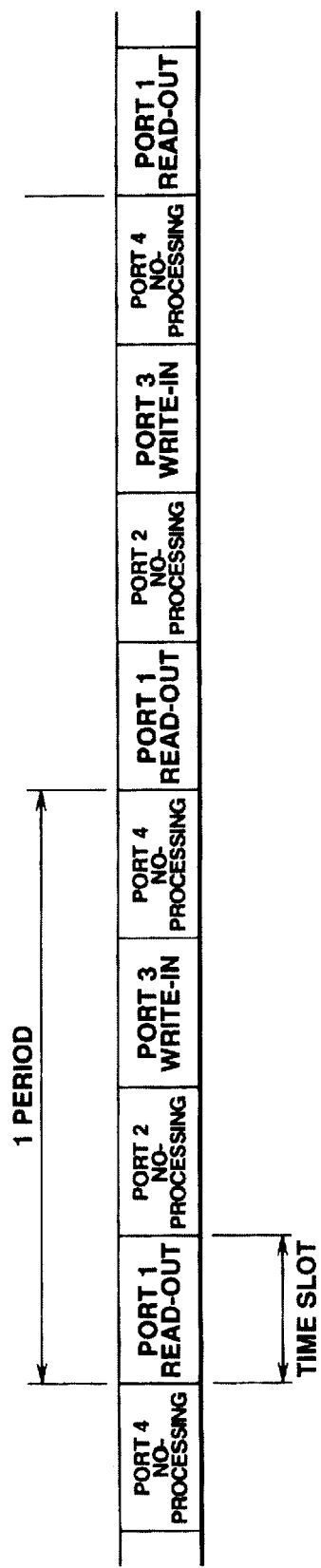
FIG. 1 is a timing chart illustrating how time slots are allocated to different ports in a conventional AV server system.
Figure 2:
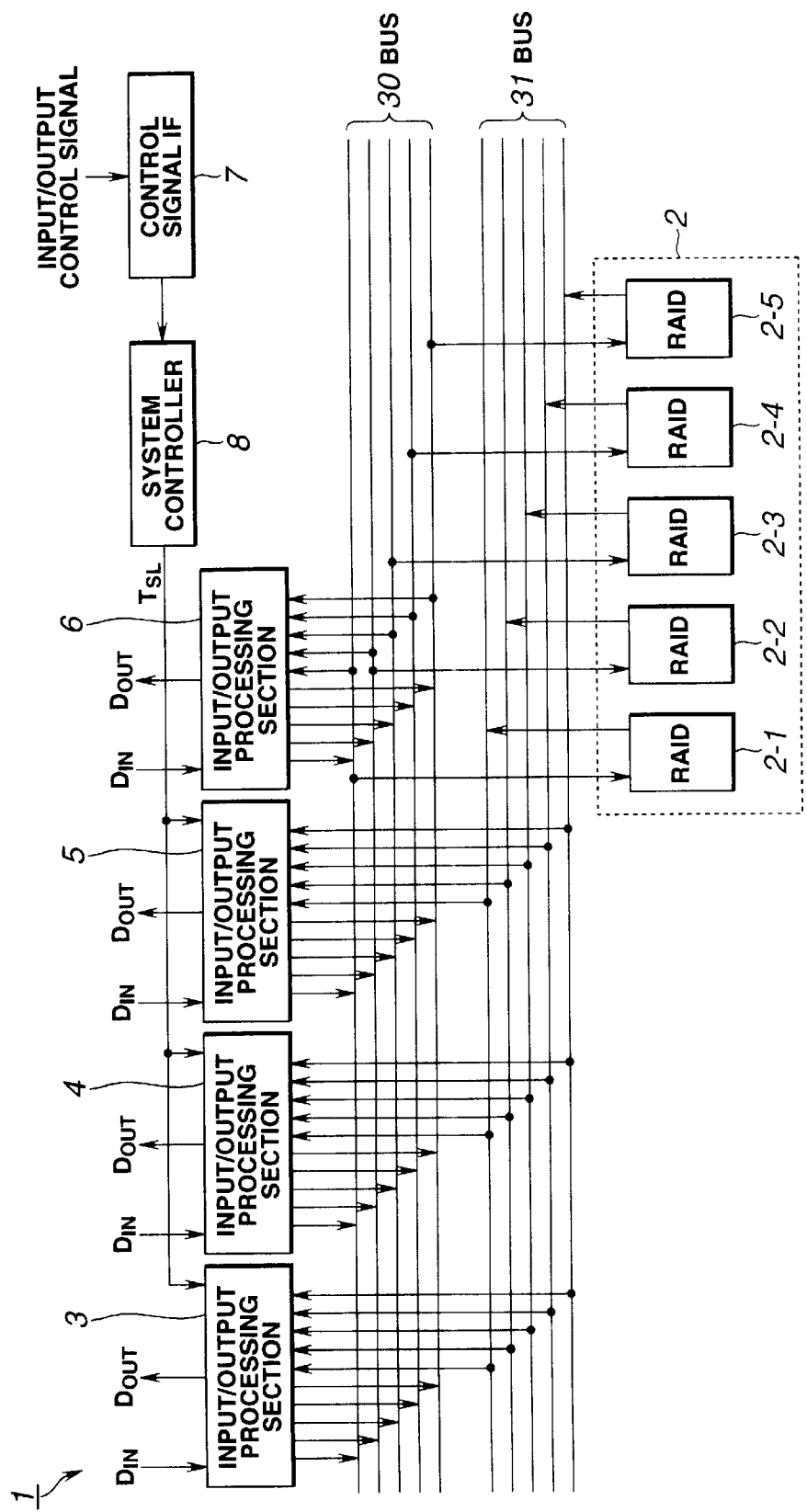
FIG. 2 is a schematic block diagram of an AV server system realized by applying the present invention.

Now, the present invention will be described in greater detail by referring to the accompanying drawings that illustrate preferred embodiments of the invention. FIG. 2 is a schematic block diagram of an AV server 1 realized by applying the present invention and adapted to store, reproduce, edit and distribute AV (audio and/or video) data by way of four channels, said AV server 1 comprising a data storage 2 for storing AV data, input/output processing sections 3, 4, 5 and 6 adapted to access data storage 2 in order to input/output AV data, a control signal interface (IF) 7 and a system controller 8 for controlling the operation of the entire system. Additionally, the input/output processing sections 3, 4, 5 and 6 are connected to the data storage 2 by way of buses 30 and 31. For the convenience of description, the input/output processing sections 3, 4, 5 and 6 will be referred to as port 1, port 2, port 3 and port 4 respectively hereinafter.

Figure 6:
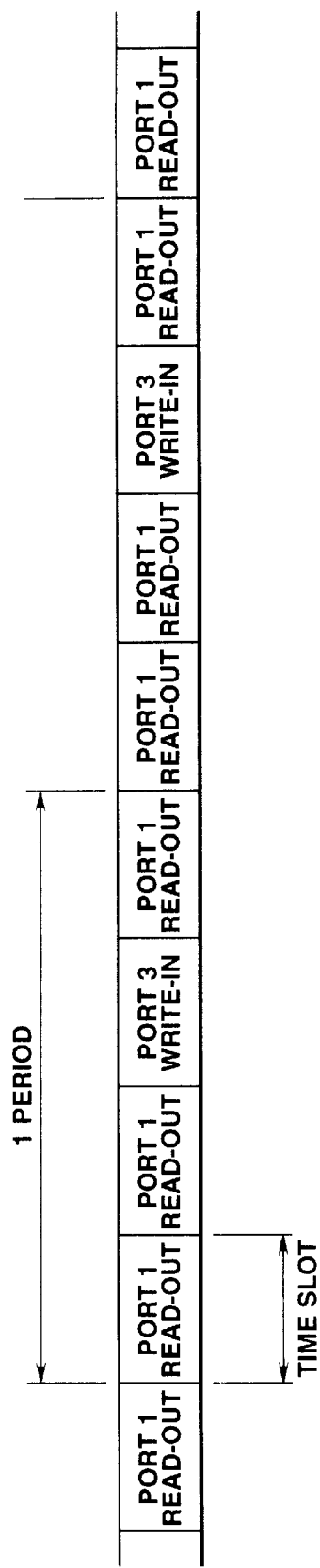
FIG. 6 is a timing chart that can be used for allocating time slots to different ports for the purpose of the invention.

In the AV server 1, the system controller 8 allocates time slots to the ports on a time division basis so that each of the ports may access the data storage 2 during each time slot allocated to it. More specifically, as shown in FIG. 6, the system controller 8 selects a fixed cycle period and evenly divides each period into four time slots, which are then allocated sequentially to the port 1 through port 4. Therefore, each port is allocated with a time slot in each cycle period, which is equal to one fourth of the period.

From the viewpoint of reproducing AV data, the length of each time slot is so selected that a volume of AV data that may be reproduced continuously within a period from a time slot to the next allocated to it can be stored from the data storage 2 to the memory of the port. Thus, in the AV server 1, the port can reproduce AV data continuously as it output the AV data from its memory from a time slot to the next allocated to it.

For recording AV data, on the other hand, conversely a volume of AV data is stored in the memory of the port in each period and then written into the data storage 2 collectively during the time slot allocated to the port. Thus, from the viewpoint of recording AV data, the length of a time slot in a period is so selected that a volume of AV data necessary for an ordinary data reproducing operation can be read out and stored in the memory of each port during the time slot, although the length has to be made as short as possible.

The control signal IF 7 receives input/output control signal fed from a control panel (not shown) or some other signal source and transfers them to the system controller 8. The input/output control signals that the control signal IF 7 receives include commands for normal data recording and reproduction, stopping the data recording/reproducing operations, slow data reproduction, high speed data reproduction as well as additional information such as information on search speed including the normal to slow reproduction ratio and the normal to high speed reproduction ratio.

The system controller 8 controls the data storage 2 and the ports according to the input/output control signals from the control signal IF 7 and performs AV data recording/reproducing operations in a manner as described below. For recording AV data, the system controller 8 processses the AV data input through one or more than one ports so as to transform them to show a data format adapted to recording in the data storage 2 and compress, if necessary, the data before it transmits the transformed and compressed, if appropriate, data to the data storage 2 for recording. For reproducing AV data, on the other hand, the system controller 8 reads out the data from the data storage 2 and expand, if necessary, the data before it transmits the data to one or more than one ports, where the data are transformed to show an ordinary AV data format and then output.

Now, the configuration and the operation of each of the input/output processing sections 3, 4, 5 and 6 will be described in detail by referring to FIG. 3A and 3B.

Each of the input/output processing sections comprises for the recording side of the function thereof an input circuit 211, a serial/parallel conversion processing section 212, memories 212-1 through 213-5 and bus output processing sections 214-1 through 214-5 as shown in FIG. 3A.

On the other hand, each of the input/output processing sections comprises for the reproduction side of the function thereof bus input circuits 231 -1 through 231-5, memories 233-1 through 233-5, a parallel/serial conversion processing section 234 and an output circuit 236 as shown in FIG. 3B.

Referring to FIG. 3A, the input circuit 211 picks up AV data $D_W$ from the externally input data $D_{IN}$ and feeds them to the serial/parallel conversion processing section 212. The externally input data $D_{IN}$ may typically show the SDI (serial digital interface) format standardized in SMPTE-259M or the SDTI (serial digital transfer interface) format standardized in SMPTE-305M. If necessary, the data are subjected to various compression processes before they are fed to the serial/parallel conversion processing section 212.

The serial/parallel conversion processing section 212 converts the AV data $D_W$ that are serial data into parallel AV data $D_{WP-1}$ through $D_{WP-5}$ and feeds them to the memories 213-1 through 213-5.

The memories 213-1 through 213-5 temporarily stores the parallel AV data $D_{WP-1}$ through $D_{WP-5}$ and, once time slot signals are supplied from the system controller 8 as described above, they read out the AV data $D_{WP-1}$ through $D_{WP-5}$ they stores and feed them to the bus output processing sections 214-1 through 214-5.

The bus output processing sections 214-1 through 214-5 transform the AV data $D_{WQ-1}$ through $D_{WQ-5}$ fed from the memories 213-1 through 213-5 into data with a format adapted to be output to the bus 30 before they actually output the data. A data format as disclosed in Japanese Patent Application Laid-Open No. 9-200673 and comprising AV data and command data for the AV data may suitably be used as data format for the bus 30. Although not shown, control signals for controlling the operation of recording AV data are fed from the system controller 8 to the bus output processing sections 214-1 through 214-5 and then to the data storage 2 along with the AV data.

Referring now to FIG. 3B, the bus input processing sections 231-1 through 231-5 pick up respectively AV data $D_{RS-1}$ through $D_{RS-5}$ from the data fed from the data storage 2 in the above described bus data format and output them to the memories 233-1 through 233-5.

The memories 231-1 through 231-5 temporarily store the AV data $D_{RS-1}$ through $D_{RS-5}$ fed from the bus input processing sections 231-1 through 231-5 and then output them to the parallel/serial conversion processing circuit 234.

The parallel/serial conversion processing section 234 transform the AV data $D_{RM-1}$ through $D_{RM-5}$ fed from the memories 233-1 through 233-t into serial data and output the latter into output circuit 236.

The output circuit 236 processes the data in a manner just reverse to the processing operation of the input circuit 211 before it externally outputs output data $D_{OUT}$.

Now, the configuration and the operation of each of the RAID 2-1 through 2-5 of the data storage 2 of FIG. 2 will be described in detail by referring to FIG. 4.

Figure 4:
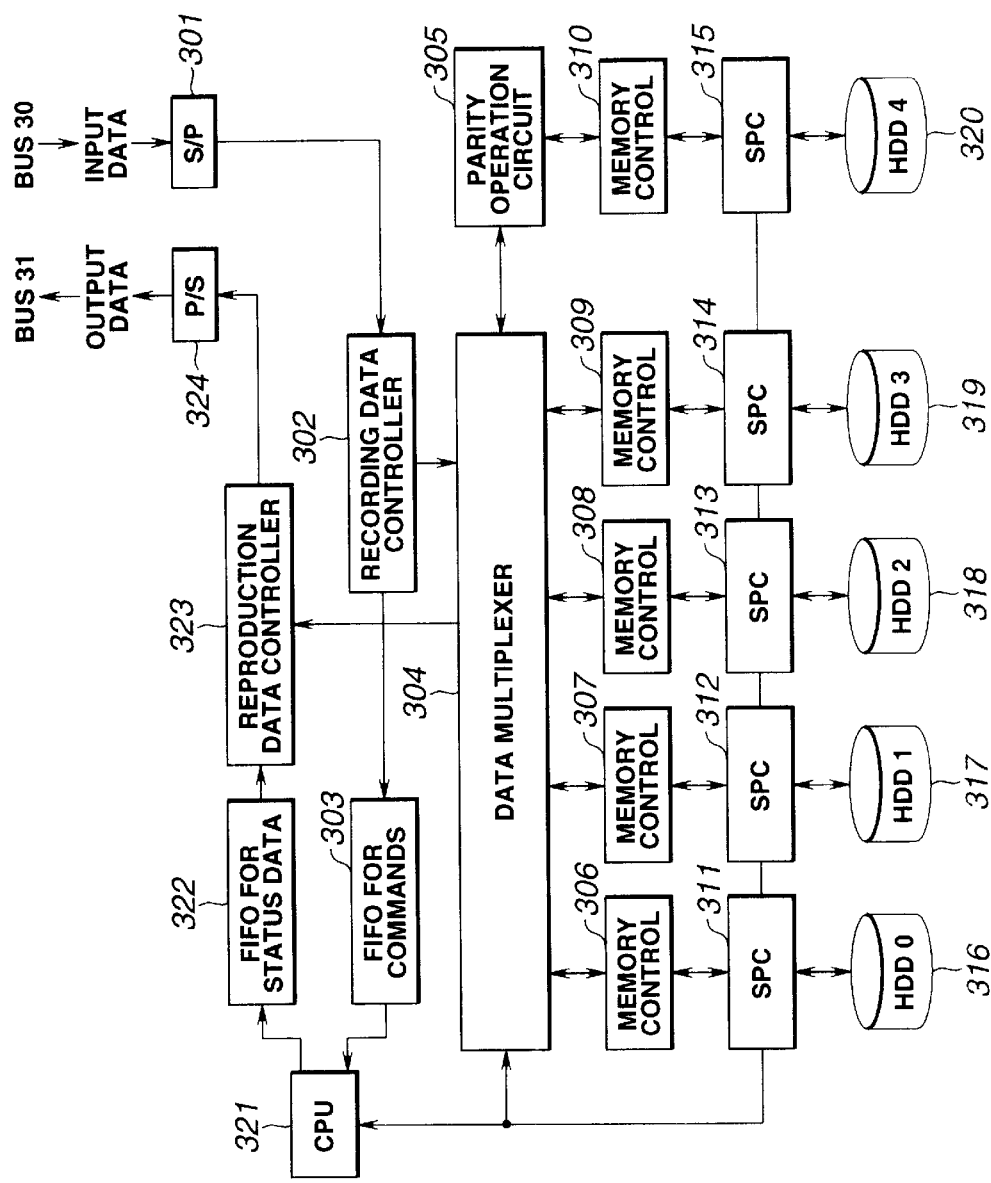
FIG. 4 is a schematic block diagram of each of the RAID 2-1 through 2-5 of the data storage 2.

Referring to FIG. 4, each of the RAID 2-1 through 2-5 comprises a serial/parallel conversion processing section 301, a recording data controller 302, an FIFO 308 for commands, a data multiplexer 304, a parity arithmetic circuit 305, memory controls 305 through 310, SPCs (SCSI protocol controllers) 311 through 315, HDDs (hard disk drives) 316 through 320, a CPU 321, an FIFO 322 for status data, a data controller 323 for data reproduction and a parallel/serial conversion processing section 324.

The serial/parallel conversion processing section 301 transforms the serial data fed from the bus 30 into parallel data and outputs them to the recording data controller 302.

The recording data controller 302 separates the command data and the AV data inserted into the above described data format, of which the command data are fed to the FIFO 303 for commands, whereas the AV data are fed to the data multiplexer 304.

The FIFO 303 for commands temporarily stores the command data fed from the recording data controller 302 and then outputs them to the CPU 321.

The CPU 321 outputs control signals to the data multiplexer 304 and the SPC 311 through 315 for controlling various operations of processing the AV data isolated by the recording data controller 302 according to the command data fed from the FIFO 303 for command data.

The data multiplexer 304 sorts out the AV data fed from the recording data controller 302 according to the control signals from the CPU 321 so as to make them recorded in the HDDs 316 through 320 and then outputs them to the memory controls 305 through 310 or multiplexes the AV from the memory controls 305 through 310 before it outputs them to the recording data controller 323.

The data multiplexer 304 is connected to the parity arithmetic circuit 305, which performs arithmetic operations on the parities of the AV data fed from the data multiplexer 304 and outputs the obtained parity data to the memory control 310. When it cannot read out other AV data from the HDDs 316 through 319 on the basis of the parity data fed from the memory control 310, it corrects and reconstructs the AV data it cannot read out and then outputs the reconstructed AV data to the data multiplexer 304.

The memory controls 305 through 310 temporarily store the AV data fed from the data multiplexer 304 and also the parity data fed from the parity arithmetic circuit 305 and output them to the SPC 311 through 315. They also temporarily store the AV data and the parity data fed from the SPCs 311 through 315 and outputs them to the data multiplexer 304 and the parity arithmetic circuit 305.

The SPCs 311 through 315 are interfaces with the SCSIs (small computer system interfaces), which are connection buses with the HDDs 316 through 320, and adapted to feed the HDDs 316 through 320 with AV data.

Each of the HDDs 316 through 320 contains a plurality of HDs. They are adapted to write the AV data fed from the SPCs 311 through 315 by way of the SCSIs onto the HDs and read the AV data written on the HDs according to the control signals from the SPCs 311 through 315.

The reading operation is conducted according to the command inserted into the input data entered by way of the bus 30 to indicate a data reproducing operation. More specifically, the reproduction command inserted into the input data is transferred to the CPU 321 by way of the FIFO 303 for commands and the CPU outputs a control signal to the SPCs 311 through 315 to indicate a data reproducing operation. Upon receiving a control signal indicating a data reproducing operation, the HDDs 316 through 320 read out their AV data according to the control signal and output them to the SPCs 311 through 315.

The AV data red out from the HDDs 316 through 320 are then input to the data multiplexer 304 by way of the SPC 311 through 315 and the memory controls 306 through 310, where they are multiplexed and fed to the reproducing data controller 323.

The reproducing data controller 323 operates to make the status data for the command input from CPU 321 to be input by way of the FIFO 322 for status data and show the data format same as the one described above for the bus 30 so that the read out AV data and the status data are multiplexed and fed to the parallel/serial conversion processing section 324.

The parallel/serial conversion processing section 324 transforms the input data into serial data, which are then output to the bus 31 as output data.

The system controller 8 of the AV server 1 appropriately modifies the allocation of time slots to the ports according to the input/output control signal from the control signal IF 7 and the allocation priority as will be described hereinafter. Now, the processing operation of the system controller 8 will be described by referring to the flow chart of FIG. 5.

Figure 5:
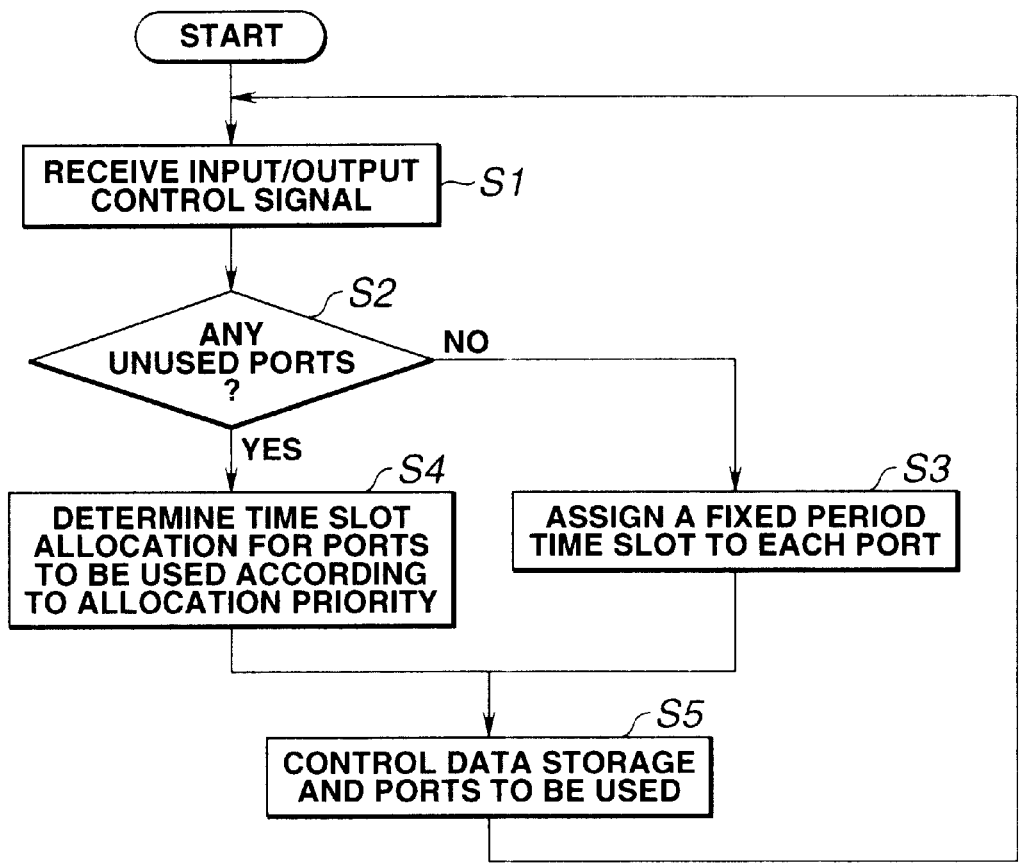
FIG. 5 is a flow chart illustrating a processing operation of the CPU.

Referring to FIG. 5, in Step S1, the system controller 8 receives an input/output control signal from the control signal IF 7.

Then, in Step S2, the system controller 8 determines if there is an idle port or not according to the received input/output control signal. If there is not any idle port, it proceeds to Step S3. If, on the other hand, there is an idle port, it proceeds to Step S4.

If the system controller 8 determines that there is not idle port, it evenly allocates the time slots of the fixed period to all the ports (Step S3) and proceeds to Step S5.

If, on the other hand, the system controller 8 determines that there is at least an idle port, it determines to allocate the time slots to the engaged ports according to the predetermined allocation priority (Step S4) and proceeds to Step S5. More specifically, because there arises idle time slots that will otherwise be allocated to the idle port, the system controller 8 reallocates the idle time slots to the engaged ports according to the priority. Thus, the most frequently accessed port will have priority for the time slot allocation.

Then, in Step S5, the system controller 8 carries out AV data input/output operations by controlling the data storage 2 and the engaged ports in accordance with the time slots allocated in Step S3 or S4. While carrying out the above operations in Step S5, the system controller 8 receives an input/output control signal of Step S1 and also carries out the processing operations from Steps S2 on if it received a modified input/output control signal in Step S1.

Now, the way how the system controller 8 allocates time slots to the ports will be described. Assume here that the input/output control signal received by the system controller 8 in Step S1 contains, a command directing a high speed AV data reproducing operation for Port 1, a command directing an AV data recording operation for Port 3 and a command for not using Port 2 and Port 4. Then, the system controller 8 determines in Step S2 that there is at least an idle port and therefore proceeds to Step S4, where it allocates the time slots that are otherwise allocated to idle Port 2 and Port 4 to Port 1 and Port 3 with priority given to the one that is more frequently accessed. Since Port 3 is used for a data recording operation that can be carried out with a single time slot out of the four time slots of each period, the system controller 8 allocates only a single time slot to Port 3 for each period. Thus, the system controller 8 gives priority to Port 1 that has to be frequently accessed for a high speed data reproducing operation and, therefore, the time slots that originally belonged to Port 2 and Port 4 are assigned to Port 1 so that the latter has a total of three time slots for each period.

Thus, as shown in FIG. 6, Port 1 occupies three consecutive time slots in a period for reading out AV data whereas Port 3 takes only a single time slot in the same period for writing AV data and this cycle of operations will be repeated. With such an arrangement of time slot allocation, the number of data sheets that can be output at high speed through Port 1 in a period is equal to the number of data sheets that can be read in three time slots in a period so that a display of images like those of a slow-speed film can be effectively avoided and the operation of searching out a wanted image can be carried out efficiently in the editing session. If the system controller 8 receives a command for reversing the reproducing direction or modifying the rate of reproduction for Port 1 during the time slot assigned to Port 3, the requirement of the command can be met only after one or two time slots to remarkably improve the responsiveness of the system controller 8 because the next time slot is used for reading AV data through Port 1.

Now, another example of time slot allocation to the ports will be discussed.

Assume here that the input/output control signal received by the system controller 8 in Step S1 contains a command directing a high speed AV data reproducing operation for Port 1 and Port 3 and a command for not using Port 2 and Port 4.

Then, the system controller 8 determines in Step S2 that there is at least an idle port and therefore proceeds to Step S4, where it allocates the time slots that are otherwise allocated to idle Port 2 and Port 4 to Port 1 and Port 3 with priority given to the one that is more frequently accessed. Since Port 1 and Port 3 are to be used for a high speed data reproducing operation and hence even in terms of priority, the system controller 8 assigns two time slots to each of Port 1 and Port 3 for each period. Note that the four time slots of each period are not allocated alternately to Port 1, Port 3, Port 1 and Port 3 but consecutively to Port 1, Port 1, Port 3 and Port 3.

Figure 7:
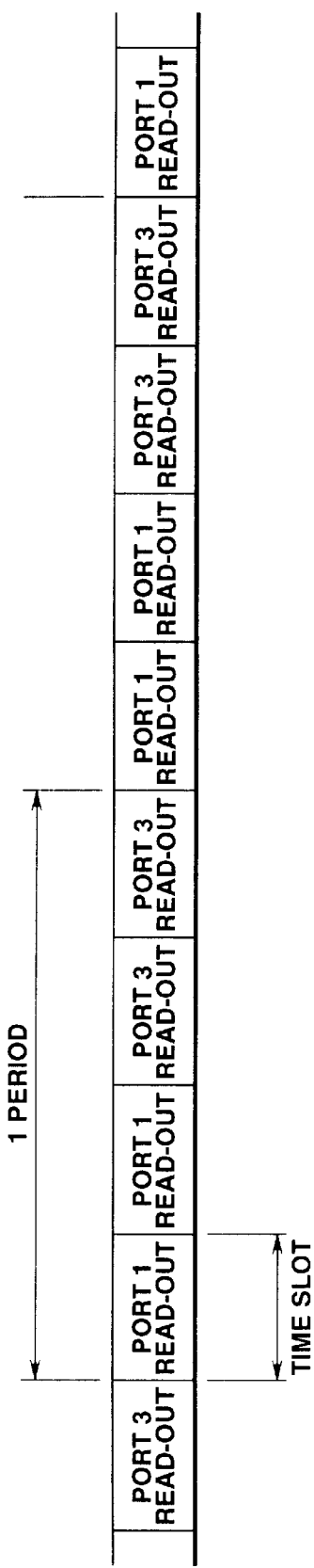
FIG. 7 is another timing chart that can also be used for allocating times slots to different ports for the purpose of the invention.

Then, as shown in FIG. 7, two consecutive time slots are used by Port 1 to read out AV data in each period, whereas the remaining two consecutive time slots are used by Port 3 to read out AV data in each period and this cycle of operations will be repeated. With such an arrangement of time slot allocation, the number of data sheets that can be output at high speed through Port 1 or Port 3 in a period is equal to the number of data sheets that can be read in two time slots in a period so that a display of images like those of a slow-speed film can be effectively avoided and the operation of searching out a wanted image can be carried out efficiently in the editing session. If the system controller 8 receives a command for reversing the reproducing direction or modifying the rate of reproduction for Port 1 during the time slot assigned to Port 3, the requirement of the command can be met only after one or two time slots to remarkably improve the responsiveness of the system controller 8 because the next time slot is used for reading AV data through Port 1.

As described above in detail, in an AV server 1 according to the invention, the system controller 8 constantly monitors the status of each of the ports to determine if it is idle or not and then reallocates the time slots to make the most of the limited time slots so that the data input/output interface operating for a high speed data reproducing operation can increase the number of data sheets it can output per unit time to facilitate the operation of searching images and improve the responsiveness of the system to the user's operation.

While the above described embodiment is a 4-channel system having four ports, the number of ports is not necessarily limited to four and any number of ports may appropriately be selected if it is not equal to one, although the use of a large number of ports is preferable because, as the number of ports increases, the number of idle ports will also increase and the volume of data that can be picked up per unit time for a high speed data reproducing operation will also be raised to increase the normal to high speed reproduction ratio.

While the number of time slots in a period is made equal to the number of ports in the above described embodiment, the present invention is by no means limited thereto and the number of time slots in a period may alternatively be made greater than the number of ports to provide reserved time slots. This arrangement is particularly advantageous when the number of ports is limited. Then, the system controller 8 can preferentially assign the reserved time slots to the most frequently accessed port on a priority basis.

Finally, while the data storage 2 of the above described embodiment comprises HDDs, the present invention is by no means limited thereto and any non-linearly accessible (random access) recording medium can be used for the purpose of the invention. Thus, the data storage 2 may alternatively comprise DVDs (digital video disks), optical disks such as MOs (magneto-optical disks), opto-magnetic disks or semiconductor memories such as flash memories or DRAMs.

What is claimed is:

1. A data recording/reproducing apparatus comprising:
   a data recording/reproducing means for recording input data including audio and/or video data in and reproducing output data from a plurality of non-linearly accessible recording mediums;
   a plurality of input/output processing means for processing said input data and outputting said input data to said data recording/reproducing means, while processing said output data from said data recording/reproducing means and outputting said output data; and
   a control means for:
      allocating respective time slots to said plurality of input/output processing means to carry out respective processing operations,
      controlling said plurality of input/output processing means so as to make said plurality of input/output processing means carry out said respective processing operations in said allocated respective time slots, and
      outputting time slot signals with a fixed cycle period to the respective input/output processing means according to said allocated time slots;
   said control means being so adapted that, when there is an idle input/output processing means out of said plurality of input/output processing means, said control means outputs the time slot signals to be output to said idle input/output processing means to one or more input/output processing means that are not idle.

2. A data recording/reproducing apparatus according to claim 1, wherein,
   if there is at least an idle input/output processing means in said plurality of input/output processing means and there is also at least a busy input/output processing means loaded with data more than the volume said busy input/output processing means can process within the time slot allocated to said busy input/output processing means, said control means outputs the time slot signal to be otherwise sent to the former input/output processing means to the latter input/output processing means.

3. A data recording/reproducing apparatus according to claim 1, wherein
   if there is not any idle input/output processing means in said plurality of input/output processing means in said first step, said control means outputs said time slot signals are assigned sequentially and respectively to said plurality of input/output processing means for the fixed cycle period.

4. A data recording/reproducing apparatus according to claim 1, wherein
   said control means holds reserved time slots by providing a number of time slots greater than the number of said plurality of input/output processing means and outputs a time slot signal to an appropriate one of said plurality of input/output processing means.

5. A data recording/reproducing method to be used for a data recording/reproducing apparatus comprising a plurality of input/output processing sections for processing and outputting input data including audio and/or video data and a plurality of non-linearly accessible recording mediums in order to record said input data output from said plurality of input/output processing sections in said recording medium and also to reproduce output data recorded in said recording medium and output said output data to said plurality of input/output processing sections; said method comprising:

a first step of allocating respective time slots to said plurality of input/output processing sections; and a second step of causing each of said plurality of input/output processing sections to carry out an operation of said input data in the time slots allocated to that input/output processing section in said first step and output the processed data to said plurality of recording mediums and also causing that input/output processing section to process said output data output from the related recording medium and externally output the processed data;

a third step of outputting time slot signals with a fixed cycle period to the respective input/output processing sections according to said allocated time slots;

said method being so adapted that, when there is an idle input/output processing section out of said plurality of input/output processing sections, said method causes the time slot signals scheduled to be output to said idle input/output processing section to be actually output to one or more input/output processing sections that are not idle.

6. A data recording/reproducing method according to claim 5, wherein if there is at least an idle input/output processing section in said plurality of input/output processing sections and there is also at least a busy input/output processing section loaded with data more than the volume said busy input/output processing section can process within the time slot allocated to said busy input/output processing section in said first step, the time slot signal to be otherwise sent to the former input/output processing section to the latter input/output processing section.

7. A data recording/reproducing method according to claim 5, wherein if there is not any idle input/output processing section in said plurality of input/output processing sections in said first step, said time slots are allocated sequentially and respectively to said plurality of input/output processing sections for the fixed cycle period.

8. A data recording/reproducing method according to claim 5, wherein reserved time slots are prepared by providing a number of time slots greater than the number of said plurality of input/output processing sections and a time slot signal is output to an appropriate one of said input/output processing sections in said third step.

9. A data recording/reproducing apparatus according to claim 1, where said control means is further so adapted that, when there is an idle input/output processing means out of said plurality of input/output processing means, said control means outputs the time slot signals to be output to said idle input/output processing means to one or more input/output processing means that are not idle according to how often each of said one or more input/output processing means that are not idle is used.

10. A data recording/reproducing method according to claim 5, where said method is further so adapted that, when there is an idle input/output processing section out of said plurality of input/output processing sections, said method causes the time slot signals scheduled to be output to said idle input/output processing section to be actually output to one or more input/output processing sections that are not idle according to how often each of said one or more input/output processing sections that are not idle is used.

* * * * *